United States Patent
Yang

(10) Patent No.: US 9,273,828 B2
(45) Date of Patent: Mar. 1, 2016

(54) AUTO FLOW STEAM TRAP

(71) Applicant: Yung-Sho Yang, New Taipei (TW)

(72) Inventor: Yung-Sho Yang, New Taipei (TW)

( * ) Notice: Subject to any disclaimer, the term of this patent is extended or adjusted under 35 U.S.C. 154(b) by 190 days.

(21) Appl. No.: 14/079,314

(22) Filed: Nov. 13, 2013

(65) Prior Publication Data

US 2015/0129050 A1    May 14, 2015

(51) Int. Cl.
*F16T 1/14* (2006.01)
*F16T 1/16* (2006.01)
*F16T 1/45* (2006.01)

(52) U.S. Cl.
CPC ...... *F16T 1/14* (2013.01); *F16T 1/16* (2013.01); *F16T 1/45* (2013.01); *Y10T 137/3031* (2015.04)

(58) Field of Classification Search
CPC ............... F16T 1/14; F16T 1/16; F16T 1/45; F16T 1/20; F16T 1/22
USPC ........... 137/177, 171, 187, 192, 188, 180, 43, 137/202; 123/518–520
See application file for complete search history.

(56) References Cited

U.S. PATENT DOCUMENTS

| | | | | |
|---|---|---|---|---|
| 302,622 | A * | 7/1884 | Coffee | F16T 1/24 137/192 |
| 310,885 | A * | 1/1885 | Dimelow | F16T 1/22 137/179 |
| 818,694 | A * | 4/1906 | Kennington | F16T 1/00 137/187 |
| 895,702 | A * | 8/1908 | Wales | B60T 17/004 137/180 |
| 913,498 | A * | 2/1909 | Hilger | F16T 1/14 137/188 |
| 914,418 | A * | 3/1909 | Hutchins | F24D 19/081 137/176 |
| 920,555 | A * | 5/1909 | Fitts | F24D 19/081 137/176 |
| 920,556 | A * | 5/1909 | Fitts | F24D 19/081 137/176 |
| 930,207 | A * | 8/1909 | Midgley | F24D 19/081 137/176 |
| 1,041,144 | A * | 10/1912 | Morgan et al. | F24D 19/081 137/176 |
| 1,157,583 | A * | 10/1915 | Roschanek | F16T 1/22 137/179 |
| 1,738,809 | A * | 12/1929 | Walter | F16T 1/22 137/179 |
| 1,870,660 | A * | 8/1932 | Strong | F16T 1/305 137/185 |
| 1,897,753 | A * | 2/1933 | Cryer | F16T 1/22 236/53 |
| 2,173,926 | A * | 9/1939 | Aikman | F16T 1/14 137/188 |
| 3,958,591 | A * | 5/1976 | Hansel | F16K 21/18 137/202 |
| 5,062,441 | A * | 11/1991 | Glukhov | B64D 11/02 137/192 |
| 6,595,234 | B2 * | 7/2003 | Sellick | F16T 1/14 137/188 |
| 6,708,713 | B1 * | 3/2004 | Gericke | B60K 15/03519 137/202 |
| 7,931,046 | B1 * | 4/2011 | Vallery | F16T 1/30 137/185 |
| 8,522,811 | B2 * | 9/2013 | Yang | F16T 1/26 137/192 |
| 2007/0137706 | A1 * | 6/2007 | Stamatakis | F16T 1/20 137/192 |
| 2013/0048105 | A1 * | 2/2013 | Yang | F16T 1/26 137/386 |
| 2015/0129050 | A1 * | 5/2015 | Yang | F16T 1/45 137/180 |

* cited by examiner

*Primary Examiner* — Craig Schneider
*Assistant Examiner* — Daniel P Donegan
(74) *Attorney, Agent, or Firm* — Birch, Stewart, Kolasch & Birch, LLP

(57) ABSTRACT

An auto flow steam trap has a hollow main casing having an inlet channel and an outlet channel, a float assembly mounted in the main casing, and a non-return valve assembly. With the non-return valve assembly mounted in the outlet channel of the main casing, the auto flow steam trap only needs one non-return valve assembly to control allowing the condensate to flow out of the main casing or not. Thus, the auto flow steam trap has advantages such as simple structure and low failure rate, easy assembling, and so on.

16 Claims, 10 Drawing Sheets

AUTO FLOW STEAM TRAP

BACKGROUND OF THE INVENTION

1. Field of the Invention

The present invention relates to an auto flow steam trap, especially to a steam trap that discharges condensate formed in a steam system.

2. Description of the Prior Art(s)

In a steam system, such as a steam pipeline, a steam container, a steam heater, and the like, when steam with high temperature and high pressure is cooled down, condensate is formed in the steam system. A steam trap that is connected to the steam system discharges the condensate in the steam system and maintains heating effect of the steam system.

A conventional steam trap comprises a hollow body, a partition panel, and at least one float assembly. The hollow body has a condensate inlet, a condensate outlet, and a drain channel. The partition panel is securely mounted in the hollow body and divides an interior of the hollow body into an upper chamber and a lower chamber. The drain channel communicates with the lower chamber and the condensate outlet. The at least one float assembly is mounted on the partition panel. Each of the at least one float assembly has a float seat, a non-return valve assembly, a float, and an adjusting tube. The float seat is mounted on and through the partition panel. The non-return valve assembly is mounted in the float seat and is disposed at the lower chamber of the hollow body. The float is movably mounted in the float seat and is disposed at the upper chamber of the hollow body. The adjusting tube protrudes down from a bottom of the float, is slidably mounted through the partition panel, protrudes into the lower chamber of the hollow body, and has at least one guiding hole. Each of the at least one guiding hole is formed through the adjusting tube, extends longitudinally, and has a uniform width from top to bottom.

Condensate from the steam system flows into the steam trap through the condensate inlet and is accumulated in the upper chamber of the hollow body. As the condensate accumulated in the upper chamber increases, the float is lifted and the adjusting tube moves up accordingly. When the at least one guiding hole of the adjusting tube corresponds in position to the upper chamber of the hollow body, the condensate in the upper chamber further flows into the adjusting tube via the at least one guiding hole, and opens the non-return valve assembly. Then the condensate flows into and is accumulated in the lower chamber of the hollow body, and is discharged out of the hollow body via the drain channel and the condensate outlet of the hollow body.

However, in the above-mentioned conventional steam trap, each float assembly has a specific discharge rate. Although a total discharge rate of the steam trap may be increased by increasing the number of the float assemblies, each float assembly, especially the non-return valve assembly of each float assembly, has complicated structure and needs numerous components. Accordingly, a steam trap with multiple float assemblies has complicated assembling processes and high failure rate.

To overcome the shortcomings, the present invention provides an auto flow steam trap to mitigate or obviate the aforementioned problems.

SUMMARY OF THE INVENTION

The main objective of the present invention is to provide an auto flow steam trap. The auto flow steam trap has a hollow main casing having an inlet channel and an outlet channel, a float assembly mounted in the main casing, and a non-return valve assembly mounted in the outlet channel of the main casing.

With the non-return valve assembly mounted in the outlet channel of the main casing, the auto flow steam trap only needs one non-return valve assembly to control allowing the condensate to flow out of the main casing or not. Thus, the auto flow steam trap of the present invention has advantages such as simple structure and low failure rate, easy assembling, and so on.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
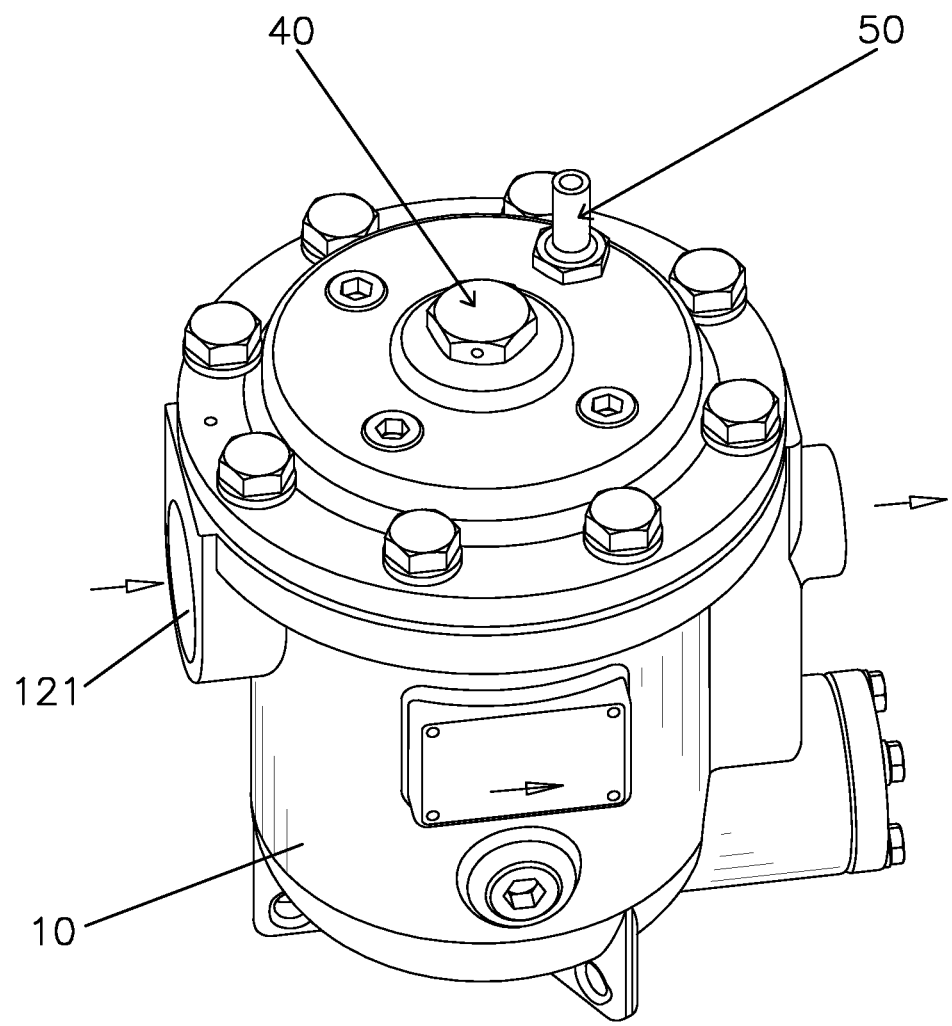
FIG. 1 is a perspective view of a first embodiment of an auto flow steam trap in accordance with the present invention.
Figure 2:
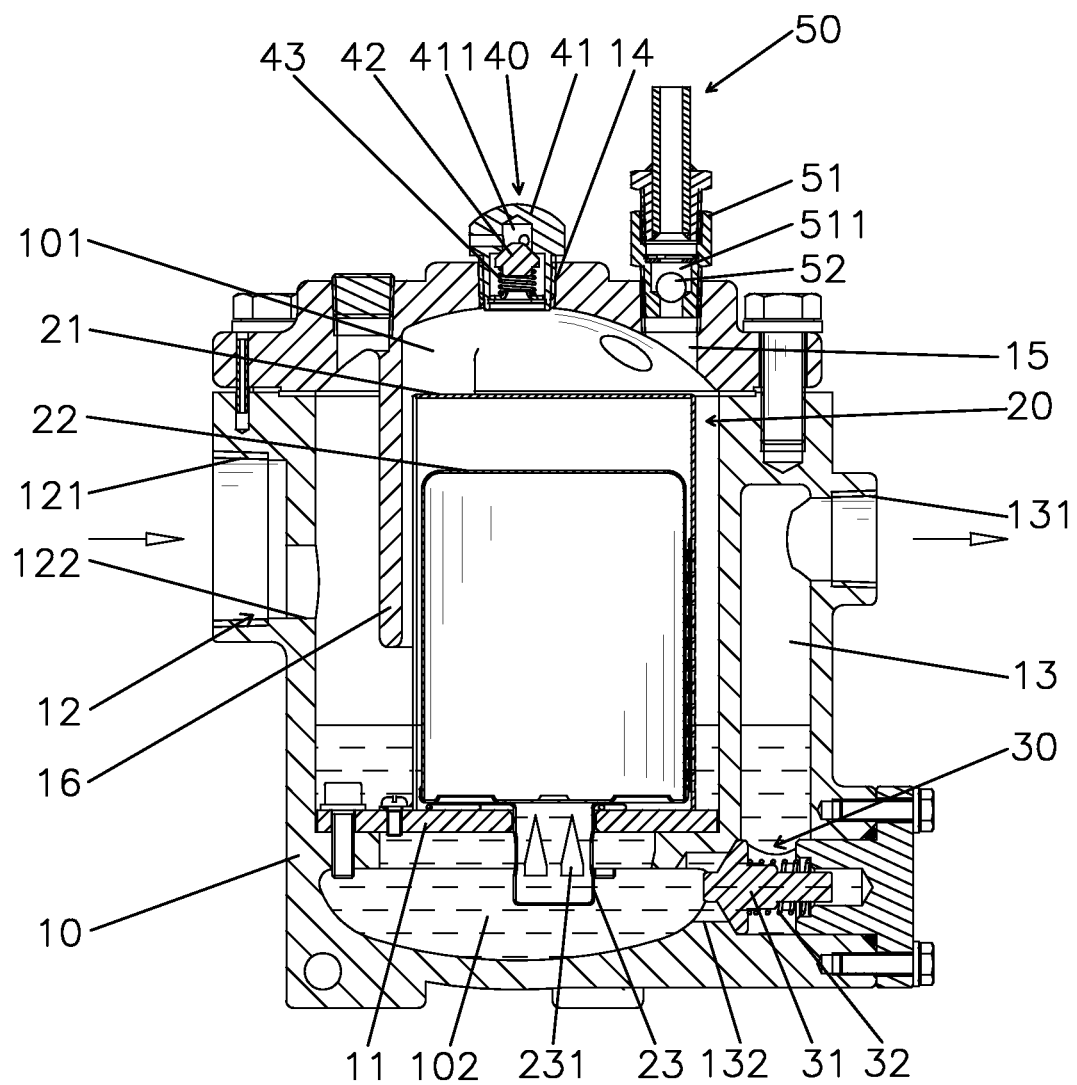
FIG. 2 is a side view in partial section of the auto flow steam trap in FIG. 1.
Figure 3:
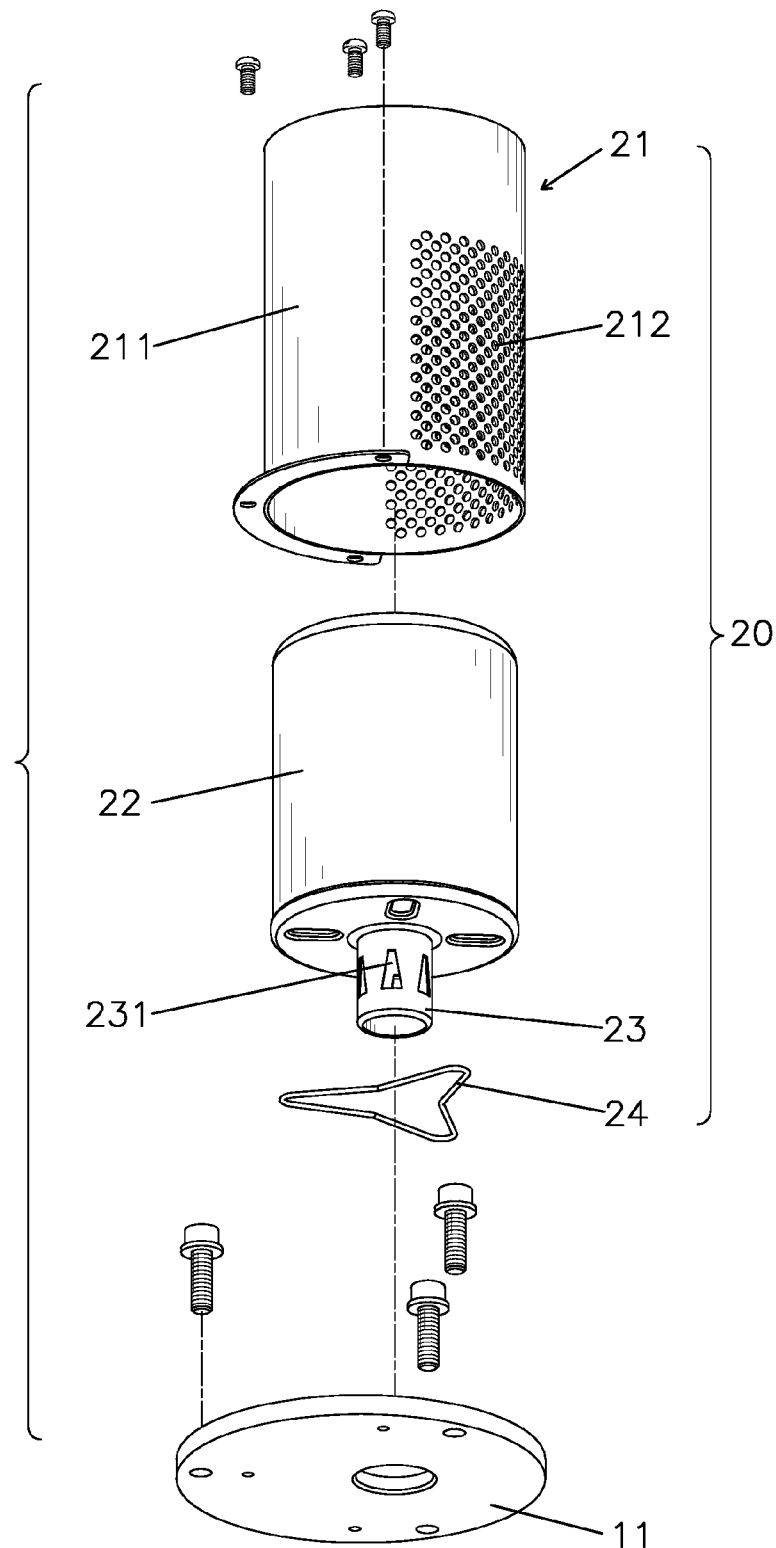
FIG. 3 is an exploded perspective view of a float assembly of the auto flow steam trap in FIG. 1.

With reference to FIGS. 1 to 3, a first embodiment of an auto flow steam trap in accordance with the present invention comprises a main casing 10, a float assembly 20, a non-return valve assembly 30, a vacuum breaking assembly 40, and a pressure equalization assembly 50.

The main casing 10 is hollow and has a peripheral wall, a top portion, a bottom portion, a partition panel 11, an inlet channel 12, an outlet channel 13, a vacuum breaking port 14, a pressure equalization port 15, and a baffle 16.

The partition panel 11 is securely mounted transversely in the main casing 10 and divides an interior of the main casing 10 into an upper chamber 101 and a lower chamber 102. The upper chamber 101 is defined between the partition panel 11 and the top portion of the main casing 10. The lower chamber 102 is defined between the partition panel 11 and the bottom portion of the main casing 10. The inlet channel 12 is formed through the main casing 10 and has an exterior inlet 121 and an interior inlet 122. The exterior inlet 121 communicates with an exterior of the main casing 10. The interior inlet 122 communicates with the upper chamber 101 of the main casing 10. The outlet channel 13 is formed through the main casing 10 and has an exterior outlet 131 and an interior outlet 132. The exterior outlet 131 communicates with the exterior of the main casing 10. The interior outlet 132 communicates with the lower chamber 102 of the main casing 10. Preferably, the inlet channel 12 and the outlet channel 13 are oppositely disposed on the main casing 10, and the interior inlet 122 is disposed adjacent to the top portion of the main casing 10.

The vacuum breaking port 14 and the pressure equalization port 15 are separately formed through the top portion of the main casing 10. The baffle 16 is mounted in the upper chamber 101 of the main casing 10 and corresponds in position to and is separated from the interior inlet 122 of the main casing 10.

With further reference to FIG. 3, the float assembly 20 is mounted in the upper chamber 101 of the main casing 10 and has a tubular strainer 21, a float 22, an adjusting tube 23, and a dividing ring 24.

The tubular strainer 21 is securely mounted on the partition panel 11 and has a peripheral wall 211, an upper closed end, a lower open end, and multiple through holes 212. The upper closed end of the tubular strainer 21 corresponds in position to the top portion of the main casing 10. The lower open end of the tubular strainer 21 corresponds in position to the partition panel 11. The through holes 212 are separately formed through the peripheral wall 211 of the tubular strainer 21.

The float 22 is slidably mounted in the tubular strainer 21. Preferably, a width of the float 22 is slightly smaller than an inner diameter of the tubular strainer 21. Thus, the float 22 can smoothly slide up and down in the tubular strainer 21 and would not sway excessively, such that the float 22 would not be damaged.

The adjusting tube 23 is mounted on and protrudes down from a bottom of the float 22, is slidably mounted through the partition panel 11, protrudes into the lower chamber 102 of the main casing 10, and has a lower open end, a peripheral wall, and at least one guiding hole 231. The at least one guiding hole 231 is formed through the peripheral wall of the adjusting tube 23. Each of the at least one guiding hole 231 extends longitudinally and tapers off toward an upper end of the at least one guiding hole 231.

The dividing ring 24 is mounted on the partition panel 11 and is disposed around the adjusting tube 23 and below the float 22. When the float 22 slides downwardly, the float 22 stacks on and abuts the dividing ring 24. Specifically, the dividing ring 24 has a quincunx-like shape.

The non-return valve assembly 30 is mounted in the interior outlet 132 of the outlet channel 13 and selectively seals or opens the interior outlet 132. In a normal status, the non-return valve assembly 30 seals the interior outlet 132. When a pressure in the lower chamber 102 of the main casing 10 is higher than a pressure of the exterior of the main casing 10, the non-return valve assembly 30 is activated to open the interior outlet 132. Accordingly, the lower chamber 102 of the main casing 10 communicates with the exterior of the main casing 10.

The vacuum breaking assembly 40 is mounted in the vacuum breaking port 14 of the main casing 10 and selectively seals or opens the vacuum breaking port 14. In a normal status, the vacuum breaking assembly 40 seals the vacuum breaking port 14. When a pressure in the upper chamber 101 of the main casing 10 is lower than the pressure of the exterior of the main casing 10, the vacuum breaking assembly 40 is activated to open the vacuum breaking port 14. Accordingly, the upper chamber 101 of the main casing 10 communicates with the exterior of the main casing 10 and would not become a vacuum.

Specifically, the vacuum breaking assembly 40 has a valve seat 41, a valve plug 42, and a resilient element 43. The valve seat 41 of the vacuum breaking assembly 40 is securely mounted in the vacuum breaking port 14 of the main casing 10 and has an intake channel 411. The intake channel 411 has an inner end communicating with the upper chamber 101 of the main casing 10, has an outer end communicating with the exterior of the main casing 10, and has a necked portion disposed between the inner and outer ends of the intake channel 411. The valve plug 42 of the vacuum breaking assembly 40 and the resilient element 43 of the vacuum breaking assembly 40 are mounted in the intake channel 411 and between the inner end and the necked portion of the intake channel 411. In a normal status, the resilient element 43 of the vacuum breaking assembly 40 pushes the valve plug 42 of the vacuum breaking assembly 40 to seal the intake channel 411 at the necked portion of the intake channel 411. When the pressure in the upper chamber 101 of the main casing 10 is lower than the pressure of the exterior of the main casing 10, the pressure of the exterior of the main casing 10 pushes the valve plug 42 of the vacuum breaking assembly 40 to press against the resilient element 43 of the vacuum breaking assembly 40. Thus, the intake channel 411 is opened, the upper chamber 101 of the main casing 10 communicates with the exterior of the main casing 10, and a vacuum in the upper chamber 101 of the main casing 10 is released.

The pressure equalization assembly 50 is mounted in the pressure equalization port 15 of the main casing 10 and selectively seals or opens the pressure equalization port 15. In a normal status, the pressure equalization assembly 50 seals the pressure equalization port 15. When the pressure in the upper chamber 101 of the main casing 10 is higher than the pressure of the exterior of the main casing 10, the pressure equalization assembly 50 is activated to open the pressure equalization port 15. Accordingly, the upper chamber 101 of the main casing 10 communicates with the exterior of the main casing 10, and the pressure in the upper chamber 101 and the pressure of the exterior of the main casing 10 are equalized.

Specifically, the pressure equalization assembly 50 has a valve seat 51 and a ball plug 52. The valve seat 51 of the pressure equalization assembly 50 is securely mounted in the pressure equalization port 15 of the main casing 10 and has an outtake channel 511. The outtake channel 511 has an inner end communicating with the upper chamber 101 of the main casing 10, has an outer end communicating with the exterior of the main casing 10, and has a necked portion disposed between the inner and outer ends of the outtake channel 511. The ball plug 52 of the pressure equalization assembly 50 is mounted in the outtake channel 511 and between the outer end and the necked portion of the outtake channel 511. In a normal status, the ball plug 52 moves down due to the gravity and seals the outtake channel 511 at the necked portion of the outtake channel 511.

When the auto flow steam trap as described is used in a steam system, the exterior inlet 121 of the main casing 10 is connected to a condensate outlet of the steam system. Condensate formed in the steam system flows into and is accumulated in the auto flow steam trap via the inlet channel 12 of the main casing 10, and then flows out of the auto flow steam trap via the outlet channel 13. The pressure equalization assembly 50 is connected to an interior of the steam system. Thus, when an air pressure in the upper chamber 101 of the main casing 10 is higher than an air pressure in the steam system, the pressure equalization assembly 50 is activated to open the pressure equalization port 15, such that the air pressure in the upper chamber 101 of the main casing 10 and the air pressure in the steam system are equalized.

In a normal status, the condensate from the steam system flows into the auto flow steam trap due to the gravity. However, when the air pressure in the upper chamber 101 of the main casing 10 becomes higher than the air pressure in the steam system, the condensate would be slowed down by air lock formed between the upper chamber 101 of the main casing 10 and the steam system. Consequently, the condensate is unable to flow into the auto flow steam trap fluently. Thus, with the pressure equalization system 50 connected to the steam system to equalize the air pressure in the upper chamber 101 of the main casing 10 and the air pressure in the steam system, the air lock between the upper chamber 101 of the main casing 10 and the steam system is avoided and the condensate is able to flow into the auto flow steam trap fluently.

Specifically, the higher air pressure in the upper chamber 101 of the main casing 10 pushes the ball plug 52 of the pressure equalization assembly 50 to depart from the necked portion of the outtake channel 511. Thus, the upper chamber 101 of the main casing 10 communicates with the steam system, and the upper chamber 101 of the main casing 10 and the steam system are equalized in air pressure.

Furthermore, since there is adhesive force between the fluid and the solid, with the dividing ring 24 dividing the float 22 and the partition panel 11, the float 22 does not stick to the partition panel 11. Therefore, the float 22 is able to smoothly move up and down, and communication between the upper chamber 101 and the lower chamber 102 of the main casing 10 is not blocked.

In the first embodiment of the auto flow steam trap as described, the inlet channel 12 and the outlet channel 13 are oppositely disposed on the peripheral wall of the main casing 10. The exterior inlet 121 and the interior inlet 122 of the inlet channel 12 are both disposed adjacent to the top portion of the main casing 10, such that the inlet channel 12 extends transversely. The exterior outlet 131 of the outlet channel 13 is disposed adjacent to the top portion of the main casing 10, and the interior outlet 132 of the outlet channel 13 communicates with the lower chamber 102 of the main casing 10, such that the outlet channel 13 extends longitudinally.

The non-return valve assembly 30 has a valve plug 31 and a resilient element 32. The valve plug 31 of the non-return valve assembly 30 is mounted in the interior outlet 132 of the main casing 10. The resilient element 32 of the non-return valve assembly 30 has two ends respectively abutting the main casing 10 and the valve plug 31 of the non-return valve assembly 30. Thus, the resilient element 32 pushes the valve plug 31 of the non-return valve assembly 30 to seal the interior outlet 132 of the main casing 10 under a normal status.

Figure 4:
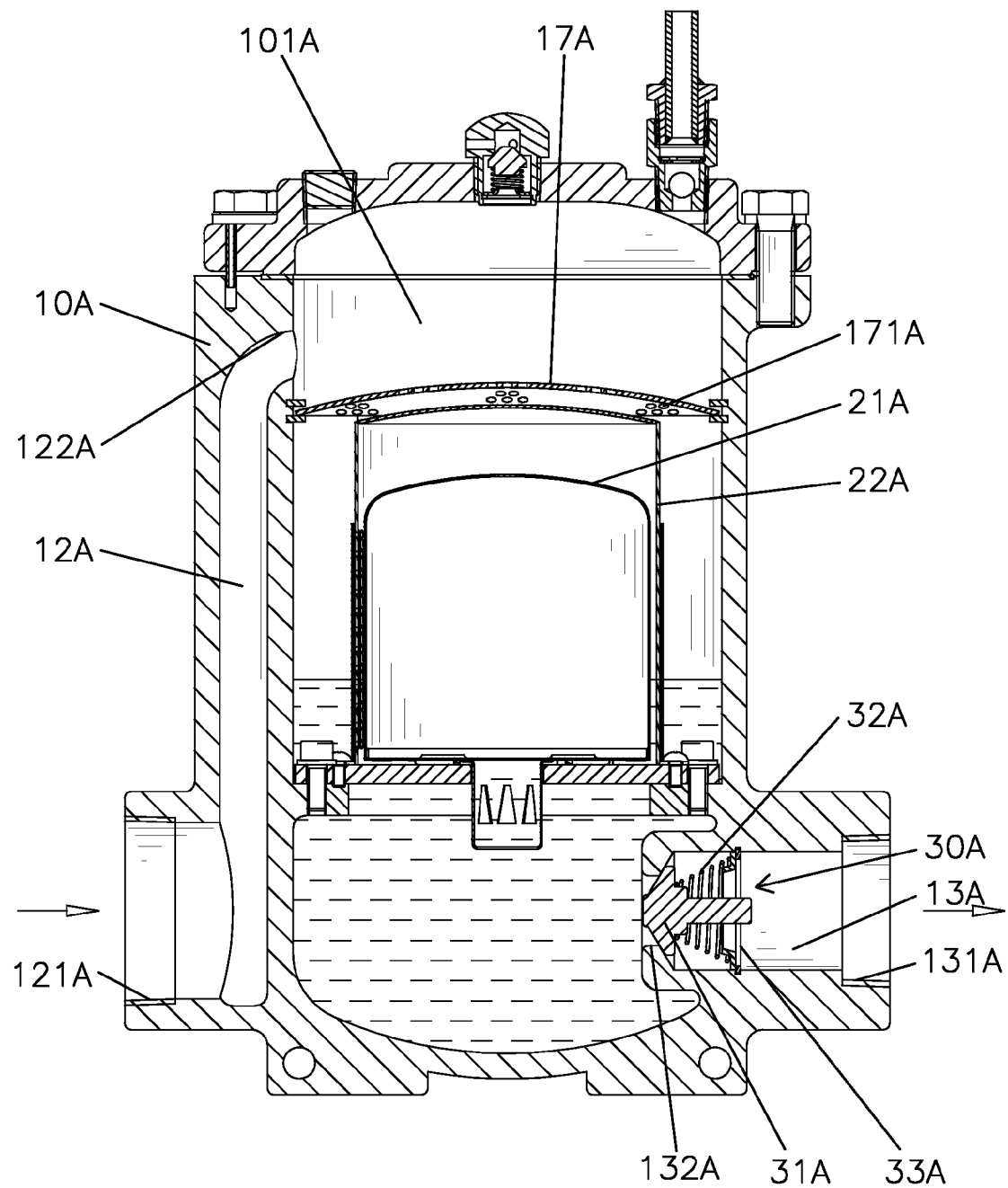
FIG. 4 is a side view in partial section of a second embodiment of an auto flow steam trap in accordance with the present invention.

With further reference to FIG. 4, in a second embodiment of an auto flow steam trap in accordance with the present invention, the exterior inlet 121A of the inlet channel 12A is disposed adjacent to the bottom portion of the main casing 10A, and the interior inlet 122A of the inlet channel 12A is disposed adjacent to the top portion of the main casing 10A, such that the inlet channel 12A extends longitudinally. The exterior outlet 131A and the interior outlet 132A of the outlet channel 13A are both disposed adjacent to the bottom portion of the main casing 10A, such that the outlet channel 13A extends transversely.

The main casing 10A further has a buffering apertured panel 17A. The buffering apertured panel 17A is mounted in the upper chamber 101A of the main casing 10A, is disposed above the tubular strainer 21A and between the interior inlet 122A and the tubular strainer 21A, and has multiple apertures 171A formed through the buffering apertured panel 17A. Thus, the buffering apertured panel 17A buffers the high temperature condensate from the interior inlet 122A of the main casing 10A to prevent the tubular strainer 21A, the float 22A and so forth from being damaged by the high temperature condensate.

The non-return valve assembly 30A has a stopper 33A, the valve plug 31A, and the resilient element 32A. The stopper 33A is securely mounted in the outlet channel 13A. The valve plug 31A of the non-return valve assembly 30A is mounted between the stopper 33A and the interior outlet 132A of the outlet channel 13A. The resilient element 32A of the non-return valve assembly 30A has two ends respectively abutting the stopper 33A and the valve plug 31A of the non-return valve assembly 30A. Thus, the resilient element 32A pushes the valve plug 32A of the non-return valve assembly 30A to seal the interior outlet 132A of the outlet channel 13A under a normal status.

Figure 5:
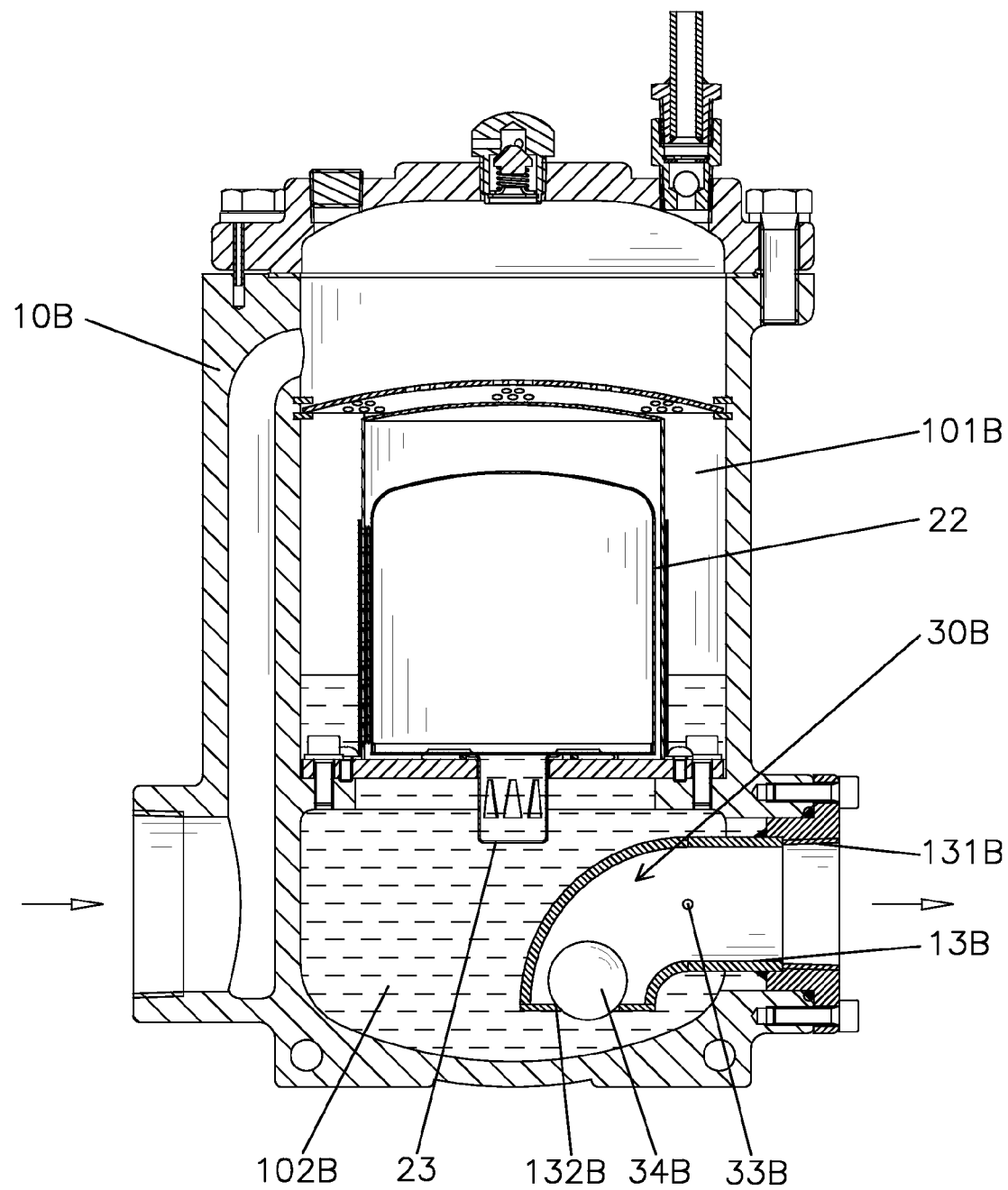
FIG. 5 is a side view in partial section of a third embodiment of an auto flow steam trap in accordance with the present invention.
Figure 6:
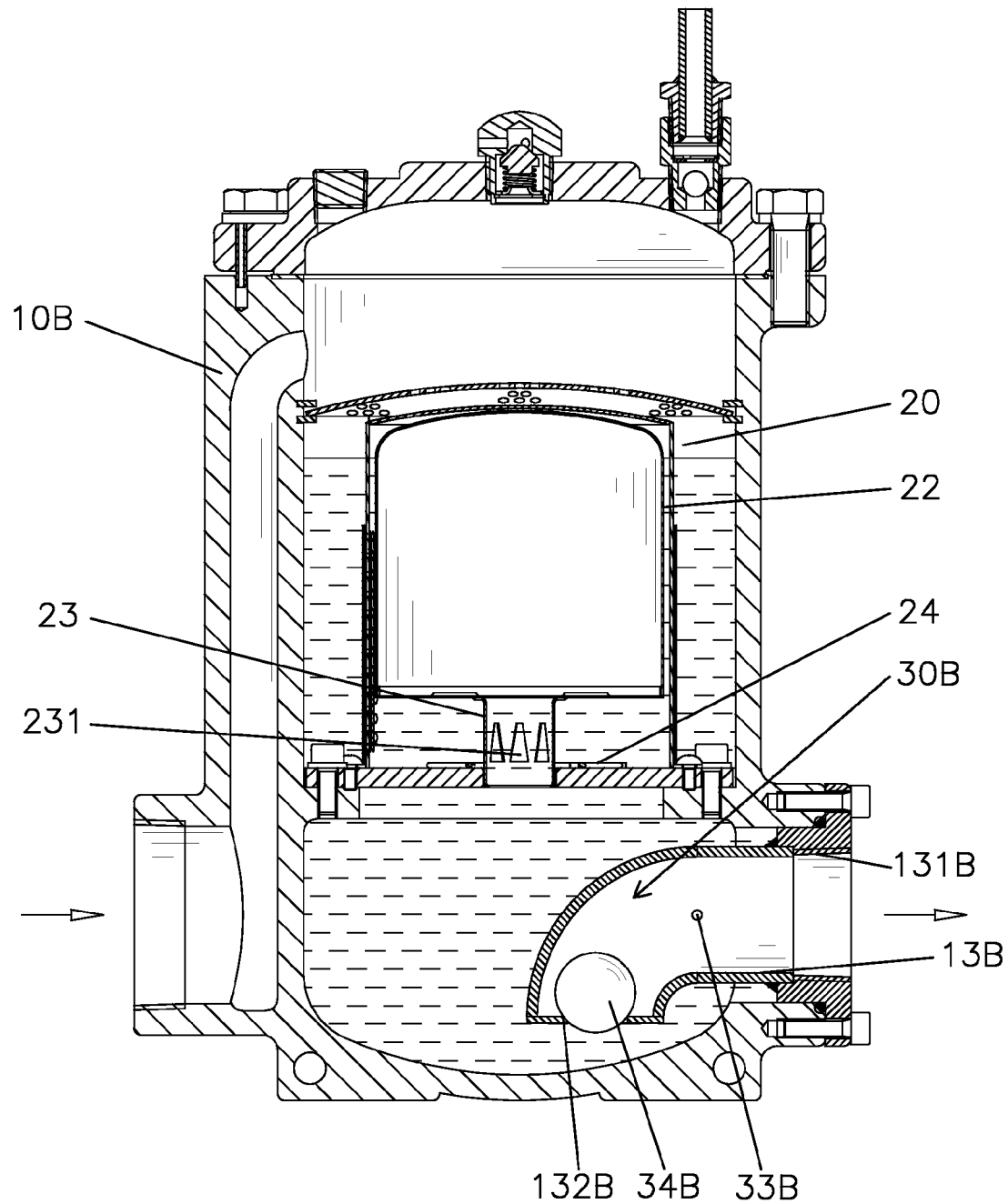
FIG. 6 is an operational side view in partial section of the auto flow steam trap in FIG. 5.

With further reference to FIGS. 5 and 6, in a third embodiment of an auto flow steam trap in accordance with the present invention, the exterior outlet 131B and the interior outlet 132B of the outlet channel 13B are both disposed adjacent to the bottom portion of the main casing 10B, and the interior outlet 132B faces the bottom portion of the main casing 10B, such that the outlet channel 13B extends transversely.

The non-return valve assembly 30B has the stopper 33B and a ball plug 34B. The stopper 33B is securely mounted in the outlet channel 13B. The ball plug 34B of the non-return valve assembly 30B is mounted in the outlet channel 13B and is disposed between the interior outlet 132B of the outlet channel 13B and the stopper 33B. In a normal status, the ball plug 34B of the non-return valve assembly 30B moves downwardly due to the gravity and seals the interior outlet 132B of the outlet channel 13B. The stopper 33B limits the ball plug 34B to prevent the ball plug 34B from dropping out of the main casing 10B. Specifically, the stopper 33B may be a rod radially mounted in the outlet channel 13B to stop the ball plug 34B from moving toward the exterior outlet 131B.

As shown in FIG. 6, as the condensate accumulated in the upper chamber 101B of the main casing 10B gradually increases, the float 22 is lifted and the adjusting tube 23 moves up accordingly. When the at least one guiding hole 231 of the adjusting tube 23 corresponds in position to the upper chamber 101B of the main casing 10B, the condensate in the upper chamber 101B further flows through the at least one guiding hole 231 of the adjusting tube 23 to flow into and be accumulated in the lower chamber 102B of the main casing 10B. Then the condensate in the lower chamber 102B pushes and opens the non-return valve assembly 30B to flow out of the main casing 10B via the outlet channel 13B. Since each of the at least one guiding hole 231 of the adjusting tube 23 tapers off toward the upper end of the guiding hole 231, the more the condensate accumulated in the upper chamber 101B of the casing 10B, the higher the float 22 and the adjusting tube 23 are lifted. An increasing rate of an area of each guiding hole 231 that corresponds in position to the upper chamber 101B is higher than an increasing rate of a height of each guiding hole 231 that is lifted. For instance, when each guiding hole 231 is lifted two times higher, the area of each guiding hole 231 that corresponds in position to the upper chamber 101 increases more than two times. Thus, discharge capacity of the steam trap of the present invention adjusts automatically and moderately accordingly to an amount of the condensate.

Figure 7:
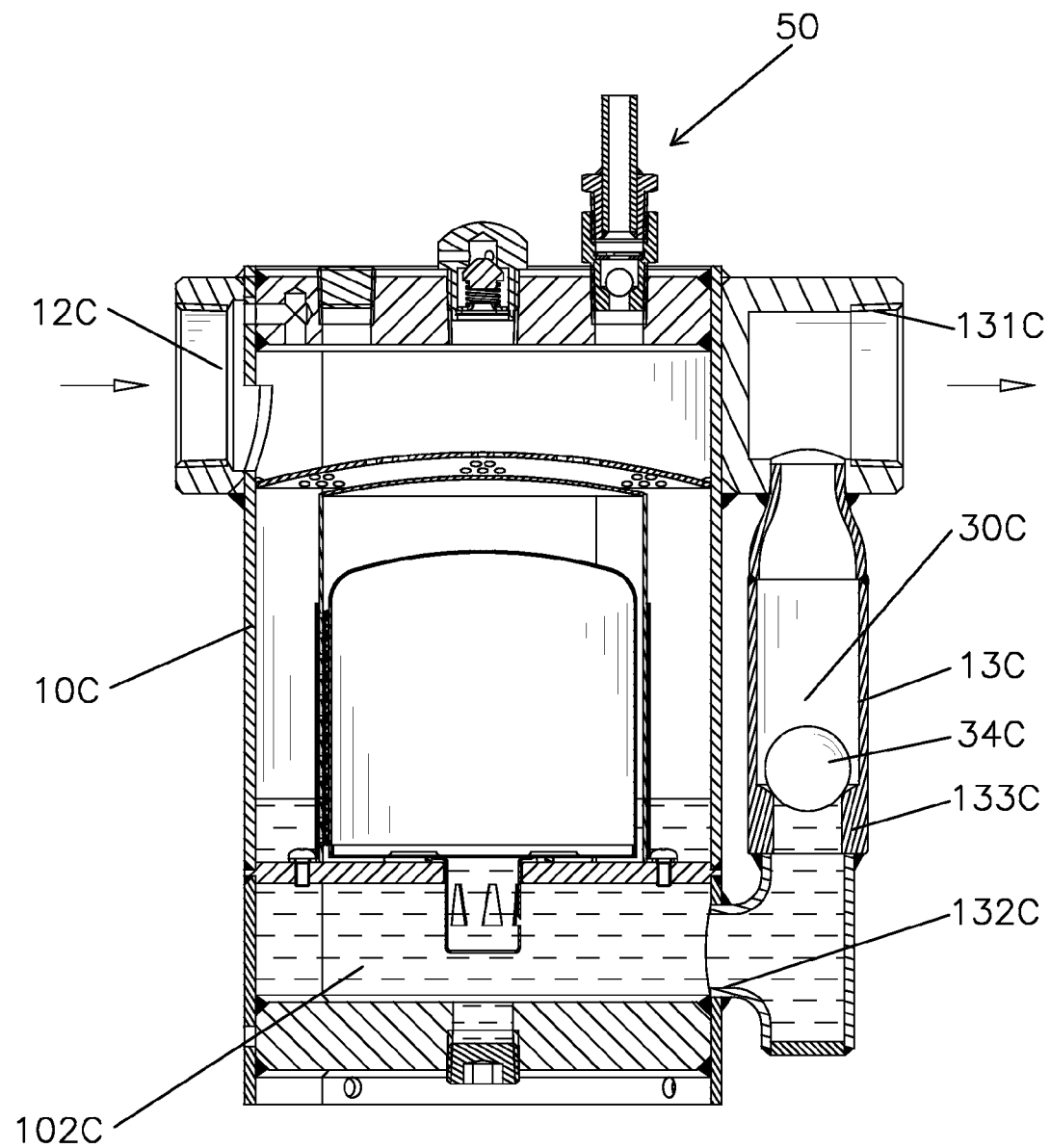
FIG. 7 is a side view in partial section of a fourth embodiment of an auto flow steam trap in accordance with the present invention.

With further reference to FIG. 7, in a fourth embodiment of an auto flow steam trap in accordance with the present invention, the exterior outlet 131C of the outlet channel 13C is disposed adjacent to the top portion of the main casing 10C, and the interior outlet 132C communicates with the lower chamber 102C of the main casing 10C, such that the outlet channel 13C extends longitudinally.

Furthermore, the outlet channel 13C further has a necked portion 133C. The non-return valve assembly 30C has the ball plug 34C. The ball plug 34C of the non-return valve assembly 30C is mounted between the exterior outlet 131C and the necked portion 133C of the outlet channel 13C. In a normal status, the ball plug 34C of the non-return valve assembly 30C moves downwardly due to the gravity to seal the outlet channel 13C at the necked portion 133C of the outlet channel 13C.

Figure 8:
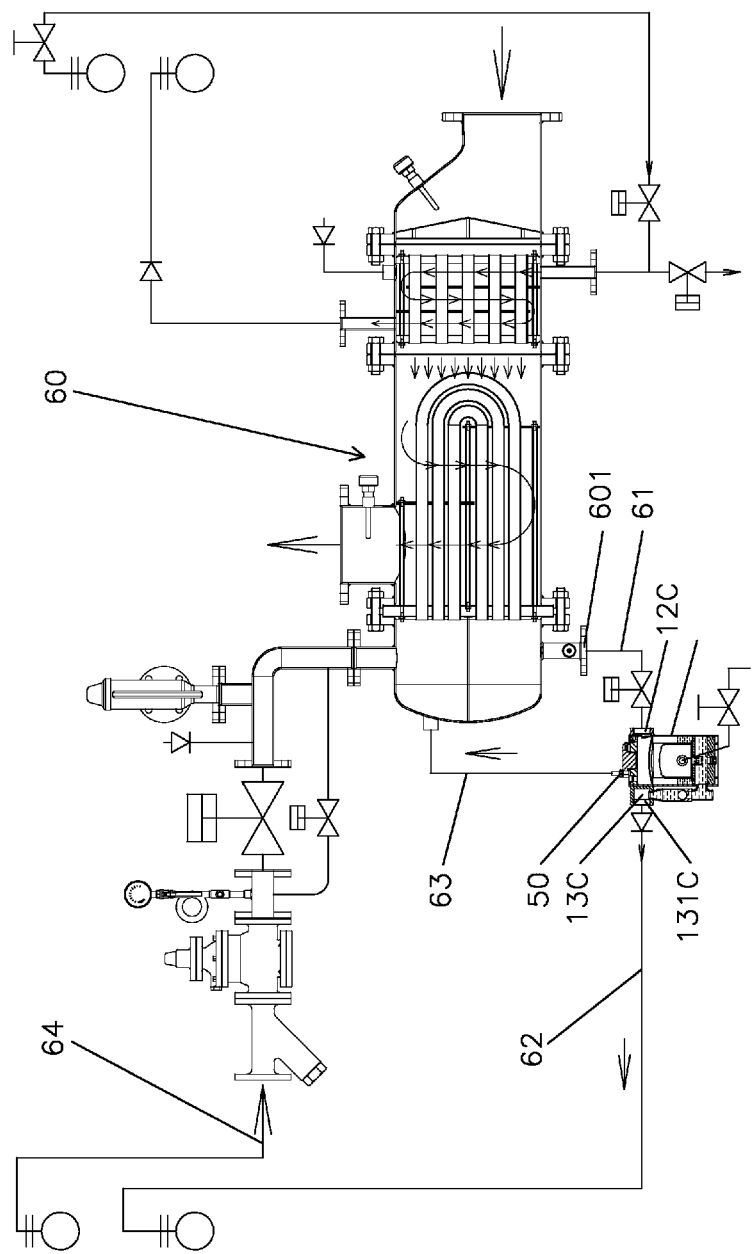
FIG. 8 is a schematic view of a steam system with the auto flow steam trap in FIG. 7.

With further reference to FIG. 8, showing the above-mentioned fourth embodiment of the auto flow steam trap is connected to a shell-and-tube heat exchanger 60. A steam inlet tube 64 is connected to a top portion of the shell-and-tube heat exchanger 60. The inlet channel 12C of the main casing 10C of the auto flow steam trap is connected to a condensate outlet 601 formed on a bottom of the shell-and-tube heat exchanger 60 via a condensate inlet tube 61. A condensate outlet tube 62 is connected to the exterior outlet 131C of the outlet channel 13C. The pressure equalization assembly 50 is connected to the top portion of the shell-and-tube heat exchanger 60 via a pressure equalization tube 63. The high temperature condensate from the shell-and-tube heat exchanger 60 flows into and is accumulated in the auto flow steam trap via the condensate inlet tube 61 and the inlet channel 12C of the main casing 10C to cool down the high temperature condensate. Then the condensate further flows out of the auto flow steam trap via the outlet channel 13C of the main casing 10C and the condensate outlet tube 62 in order to be recycled and reused.

Moreover, since a specific weight of the condensate is higher than that of air, when high temperature air exists in the upper chamber 101C of the main casing 10C and the high temperature condensate flows into and is accumulated in the upper chamber 101C of the main casing 10C, the high temperature air would be crowded out by the high temperature condensate and flows back to the top portion of the shell-and-tube heat exchanger 60 via the pressure equalization assembly 50 and the pressure equalization tube 63.

Thus, the air lock between the upper chamber 101C of the main casing 10C is avoided, the condensate flows into and out of the auto flow steam trap fluently, and the amount of the condensate that is discharged by the auto flow steam trap is increased. Furthermore, the auto flow steam trap is assured to discharge the condensate rather than the air. With the high temperature air in the auto flow steam trap flowing back to the shell-and-tube heat exchanger 60, heat of the high temperature air can be recycled in order to be fully reused to increase energy utilization and to decrease energy waste.

Figure 9:
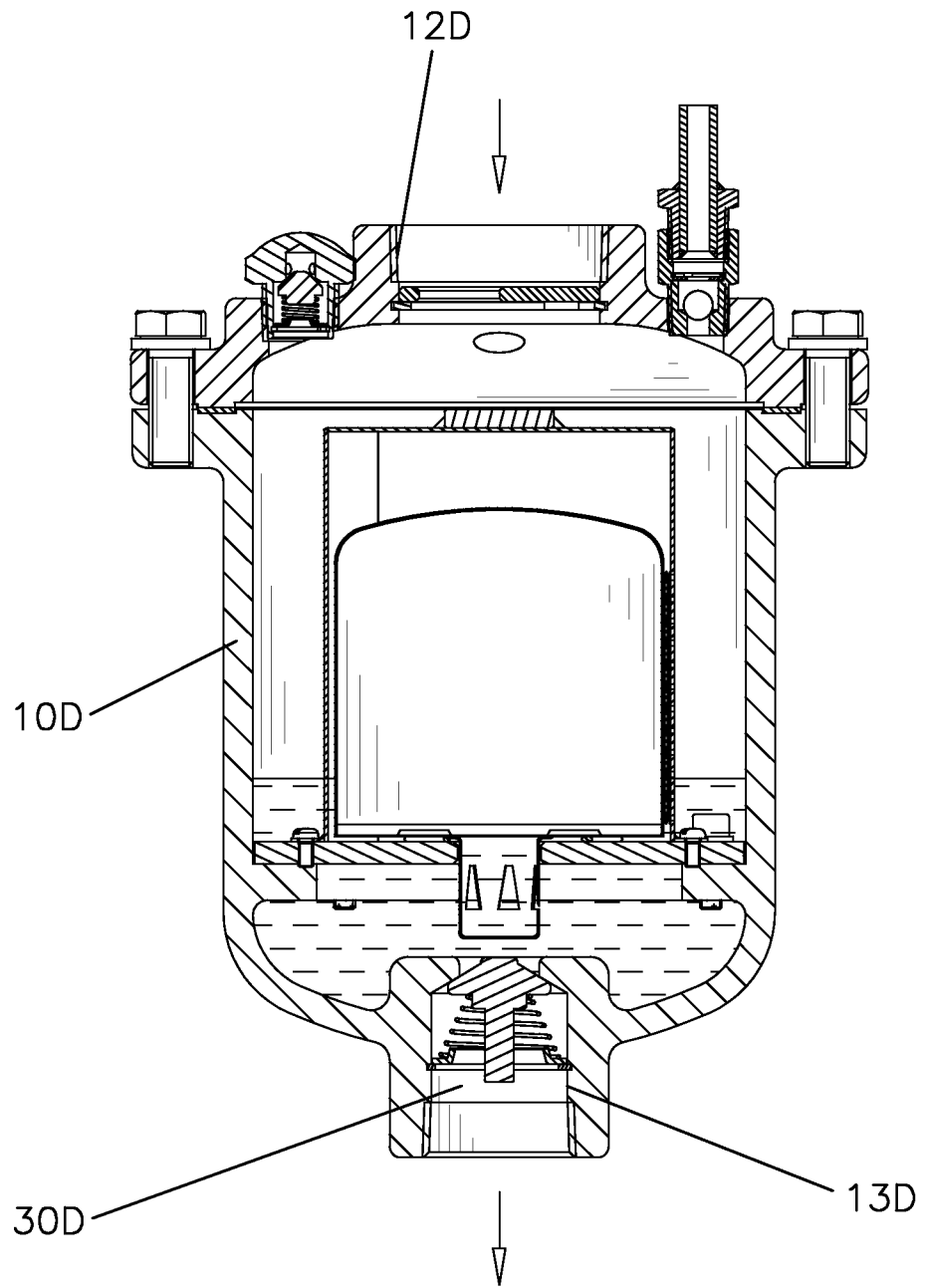
FIG. 9 is a side view in partial section of a fifth embodiment of an auto flow steam trap in accordance with the present invention.

With further reference to FIG. 9, in a fifth embodiment of an auto flow steam trap in accordance with the present invention, the inlet channel 12D is longitudinally formed through the top portion of the main casing 10D, and the outlet channel 13D is longitudinally formed through the bottom portion of main casing 10D. The non-return valve assembly 30D is the same as the non-return valve assembly 30A of the second embodiment of the auto flow steam trap.

Figure 10:
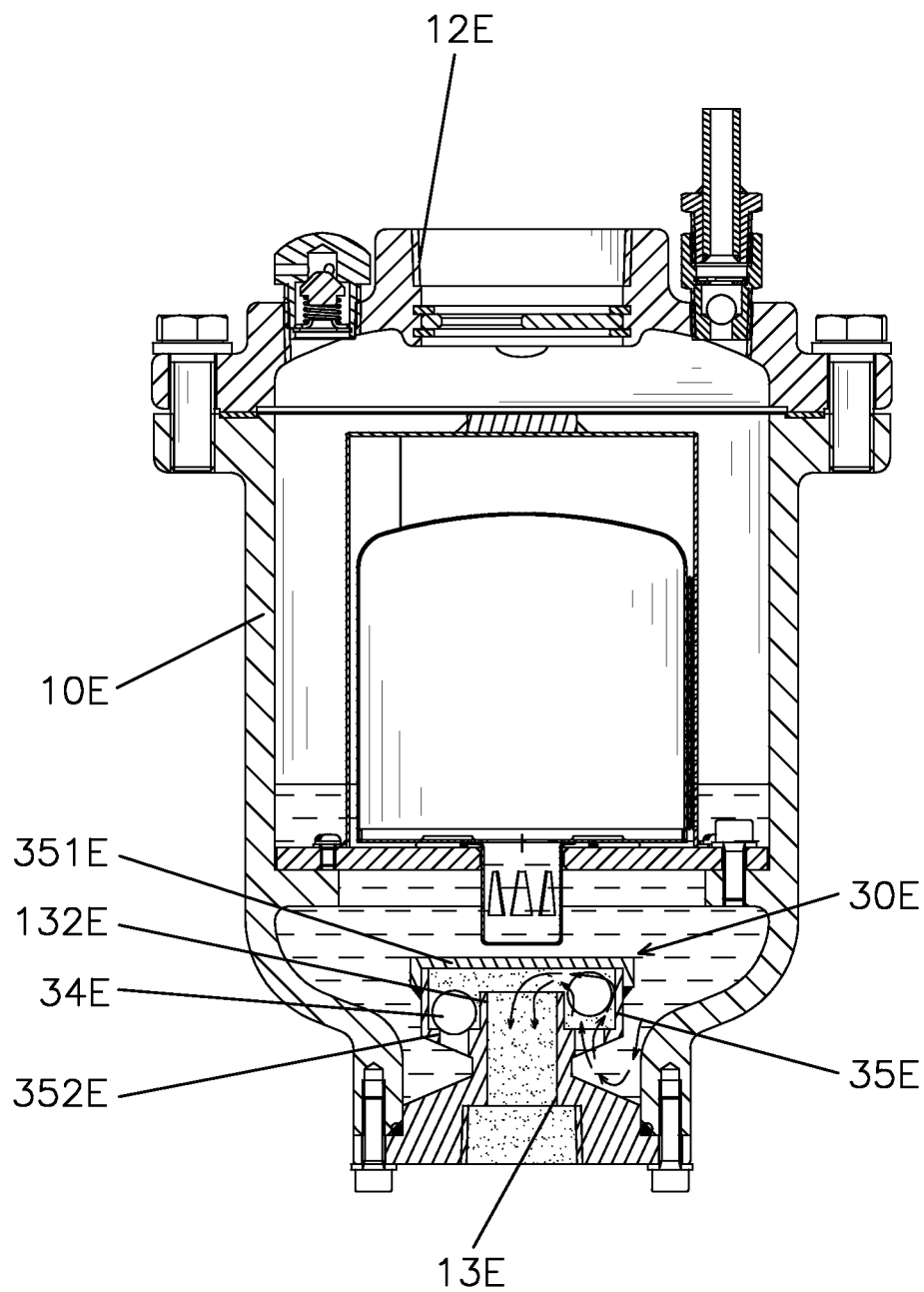
FIG. 10 is a side view in partial section of a sixth embodiment of an auto flow steam trap in accordance with the present invention.

With further reference to FIG. 10, in a sixth embodiment of an auto flow steam trap in accordance with the present invention, the inlet channel 12E is longitudinally formed through the top portion of the main casing 10E, and the outlet channel 13E is longitudinally formed through the bottom portion of main casing 10E.

The non-return valve assembly 30E has a guiding seat 35E and at least one ball plug 34E. The guiding seat 35E is securely mounted on and around the interior outlet 132E of the outlet channel 13E and has at least one interior chamber, an upper panel 351E and at least one guiding port 352E. The upper panel 351E of the guiding seat 35E is mounted above and is separated from the interior outlet 132E of the main casing 10E. Each of the at least one guiding port 352E of the guiding seat 35E faces downward and communicates with one of the at least one interior chamber of the guiding seat 35E. The at least one ball plug 34E of the non-return valve assembly 30E is mounted in the at least one interior chamber of the guiding seat 35E. Each of the at least one ball plug 34E of the non-return valve assembly 30E has a diameter longer than a distance defined between the upper panel 351E of the guiding seat 35E and the interior outlet 132E of the outlet channel 13E.

In a normal status, the at least one ball plug 34E of the non-return valve assembly 30E moves downwardly due to the gravity and seals the at least one guiding port 352E of the guiding seat 35E. Since the diameter of each ball plug 34E of the non-return valve assembly 30E is longer than the distance defined between the upper panel 351E of the guiding seat 35E and the interior outlet 132E of the outlet channel 13E, each ball plug 34E only moves in its own interior chamber of the guiding seat 35E. The at least one ball plug 34E of the non-return valve assembly 30E can be pushed by the condensate in the auto flow steam trap easily to allow the condensate to flow out of the auto flow steam trap timely and rapidly. As the pressures inside and outside the auto flow steam trap are equalized, no water hammer would occur in the condensate outlet tube 62 that is connected to the outlet channel 13E, and the condensate outlet tube 62 would not be damaged by the water hammer.

The auto flow steam trap as described has the following advantages. With the non-return valve assembly 30, 30A, 30B, 30C, 30D, 30E mounted in the interior outlet 132, 132A, 132B, 132C of the outlet channel 13, 13A, 13B, 13C, 13E, 13E of the main casing 10, 10A, 10B, 10C, 10D, 10E, the auto flow steam trap only needs one non-return valve assembly 30, 30A, 30B, 30C, 30D, 30E to control allowing the condensate to flow out of the main casing 10, 10A, 10B, 10C, 10D, 10E or not. Thus, the auto flow steam trap of the present invention has advantages such as simple structure and low failure rate, easy assembling, and so on.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An auto flow steam trap comprising:
   a main casing being hollow and having
      a peripheral wall;
      a top portion;
      a bottom portion;
      a partition panel securely mounted transversely in the main casing and dividing an interior of the main casing into an upper chamber and a lower chamber;
      an inlet channel formed through the main casing and having
         an exterior inlet communicating with an exterior of the main casing; and
         an interior inlet communicating with the upper chamber of the main casing; and
      an outlet channel formed through the main casing and having an exterior outlet communicating with the exterior of the main casing; and an interior outlet communicating with the lower chamber of the main casing;

a float assembly mounted in the upper chamber of the main casing and having a tubular strainer securely mounted on the partition panel and having a peripheral wall;

an upper closed end;

a lower open end corresponding in position to the partition panel; and multiple through holes separately formed through the peripheral wall of the tubular strainer;

a float slidably mounted in the tubular strainer; and an adjusting tube mounted on and protruding down from a bottom of the float, slidably mounted through the partition panel, protruding into the lower chamber of the main casing, and having a lower open end;

a peripheral wall; and at least one guiding hole formed through the peripheral wall of the adjusting tube, and each of the at least one guiding hole extending longitudinally and tapering off toward an upper end of the at least one guiding hole; and a non-return valve assembly mounted in the interior outlet of the outlet channel and alternatively sealing or opening the interior outlet;

wherein the non-return valve assembly seals the interior outlet in a normal status; and when a pressure in the lower chamber of the main casing is higher than a pressure of the exterior of the main casing, the non-return valve assembly is activated to open the interior outlet.

2. The auto flow steam trap as claimed in claim 1, wherein the float assembly further has a dividing ring mounted on the partition panel and disposed around the adjusting tube and below the float.

3. The auto flow steam trap as claimed in claim 1, wherein the main casing further has a baffle mounted in the upper chamber of the main casing and corresponding in position to and separated from the interior inlet of the main casing.

4. The auto flow steam trap as claimed in claim 1, wherein the main casing further has a buffering apertured panel mounted in the upper chamber of the main casing, disposed above the tubular strainer and between the interior inlet and the tubular strainer, and having multiple apertures formed through the buffering apertured panel.

5. The auto flow steam trap as claimed in claim 1, wherein the main casing further has a vacuum breaking port formed through the top portion of the main casing; and the auto flow steam trap further comprises a vacuum breaking assembly mounted in the vacuum breaking port of the main casing and selectively sealing or opening the vacuum breaking port;

wherein the vacuum breaking assembly seals the vacuum breaking port in a normal status; and when a pressure in the upper chamber of the main casing is lower than the pressure of the exterior of the main casing, the vacuum breaking assembly is activated to open the vacuum breaking port.

6. The auto flow steam trap as claimed in claim 2, wherein the main casing further has a vacuum breaking port formed through the top portion of the main casing; and the auto flow steam trap further comprises a vacuum breaking assembly mounted in the vacuum breaking port of the main casing and selectively sealing or opening the vacuum breaking port;

wherein the vacuum breaking assembly seals the vacuum breaking port in a normal status; and when a pressure in the upper chamber of the main casing is lower than the pressure of the exterior of the main casing, the vacuum breaking assembly is activated to open the vacuum breaking port.

7. The auto flow steam trap as claimed in claim 3, wherein the main casing further has a vacuum breaking port formed through the top portion of the main casing; and the auto flow steam trap further comprises a vacuum breaking assembly mounted in the vacuum breaking port of the main casing and selectively sealing or opening the vacuum breaking port;

wherein the vacuum breaking assembly seals the vacuum breaking port in a normal status; and when a pressure in the upper chamber of the main casing is lower than the pressure of the exterior of the main casing, the vacuum breaking assembly is activated to open the vacuum breaking port.

8. The auto flow steam trap as claimed in claim 4, wherein the main casing further has a vacuum breaking port formed through the top portion of the main casing; and the auto flow steam trap further comprises a vacuum breaking assembly mounted in the vacuum breaking port of the main casing and selectively sealing or opening the vacuum breaking port;

wherein the vacuum breaking assembly seals the vacuum breaking port in a normal status; and when a pressure in the upper chamber of the main casing is lower than the pressure of the exterior of the main casing, the vacuum breaking assembly is activated to open the vacuum breaking port.

9. The auto flow steam trap as claimed in claim 1, wherein the main casing further has a pressure equalization port formed through the top portion of the main casing; and the auto flow steam trap further comprises a pressure equalization assembly mounted in the pressure equalization port of the main casing and selectively sealing or opening the pressure equalization port;

wherein the pressure equalization assembly seals the pressure equalization port in a normal status; and when a pressure in the upper chamber of the main casing is higher than the pressure of the exterior of the main casing, the pressure equalization assembly is activated to open the pressure equalization port.

10. The auto flow steam trap as claimed in claim 2, wherein the main casing further has a pressure equalization port formed through the top portion of the main casing; and the auto flow steam trap further comprises a pressure equalization assembly mounted in the pressure equalization port of the main casing and selectively sealing or opening the pressure equalization port;

wherein the pressure equalization assembly seals the pressure equalization port in a normal status; and when a pressure in the upper chamber of the main casing is higher than the pressure of the exterior of the main casing, the pressure equalization assembly is activated to open the pressure equalization port.

11. The auto flow steam trap as claimed in claim 3, wherein the main casing further has a pressure equalization port formed through the top portion of the main casing; and the auto flow steam trap further comprises a pressure equalization assembly mounted in the pressure equalization port of the main casing and selectively sealing or opening the pressure equalization port;

wherein the pressure equalization assembly seals the pressure equalization port in a normal status; and when a pressure in the upper chamber of the main casing is higher than the pressure of the exterior of the main casing, the pressure equalization assembly is activated to open the pressure equalization port.

12. The auto flow steam trap as claimed in claim 4, wherein the main casing further has a pressure equalization port formed through the top portion of the main casing; and the auto flow steam trap further comprises a pressure equalization assembly mounted in the pressure equalization port of the main casing and selectively sealing or opening the pressure equalization port;

wherein the pressure equalization assembly seals the pressure equalization port in a normal status; and when a pressure in the upper chamber of the main casing is higher than the pressure of the exterior of the main casing, the pressure equalization assembly is activated to open the pressure equalization port.

13. The auto flow steam trap as claimed in claim 1, wherein the inlet channel is longitudinally formed through the top portion of the main casing.

14. The auto flow steam trap as claimed in claim 1, wherein the non-return valve assembly has a stopper securely mounted in the outlet channel;

a valve plug mounted between the stopper and the interior outlet of the outlet channel; and a resilient element having two ends respectively abutting the stopper and the valve plug of the non-return valve assembly.

15. The auto flow steam trap as claimed in claim 1, wherein the interior outlet of the outlet channel faces the bottom portion of the main casing; and the non-return valve assembly has a stopper securely mounted in the outlet channel; and a ball plug mounted in the outlet channel, disposed between the interior outlet of the outlet channel and the stopper, moving downwardly due to the gravity, and selectively sealing the interior outlet of the outlet channel.

16. The auto flow steam trap as claimed in claim 1, wherein the outlet channel is longitudinally formed through the bottom portion of main casing; and the non-return valve assembly has a guiding seat securely mounted on and around the interior outlet of the outlet channel and having at least one interior chamber;

an upper panel mounted above and separated from the interior outlet of the main casing; and at least one guiding port, and each of the at least one guiding port of the guiding seat facing downwardly and communicating with one of the at least one interior chamber of the guiding seat; and at least one ball plug mounted in the at least one interior chamber of the guiding seat, moving downwardly due to the gravity and selectively sealing the at least one guiding port of the guiding seat, and each of the at least one ball plug having a diameter longer than a distance defined between the upper panel of the guiding seat and the interior outlet of the outlet channel.

* * * * *